May 12, 1953  W. J. PASINSKI  2,638,271
DUPLEX CALCULATING MACHINE
Filed Oct. 6, 1950  2 Sheets-Sheet 1

INVENTOR.
WALTER J. PASINSKI
BY Fidler, Crouse
& Beardsley
ATTORNEYS

May 12, 1953 W. J. PASINSKI 2,638,271
DUPLEX CALCULATING MACHINE
Filed Oct. 6, 1950 2 Sheets-Sheet 2

INVENTOR.
WALTER J. PASINSKI
BY Fidler, Crowne
+ Beardsley
ATTORNEYS

Patented May 12, 1953

2,638,271

UNITED STATES PATENT OFFICE 2,638,271

DUPLEX CALCULATING MACHINE

Walter J. Pasinski, Howell, Mich., assignor to Burroughs Adding Machine Company, Detroit, Mich., a corporation of Michigan Application October 6, 1950, Serial No. 188,832

6 Claims. (Cl. 235—62)

This invention relates to improvements in duplex calculating machines, that is, to improvements in machines having a first or item accumulating register or totalizer to receive and accumulate amounts entered through the keys of the machine, and having also a second or grand total register or totalizer to receive and accumulate amounts transferred thereto from the first register or totalizer. Such a machine is disclosed in, for example, my prior Patent No. 2,240,798. In some such machines subtraction as well as addition may be performed on either or both of the registers and amounts or totals from the item register may be transferred subtractively as well as additively to the grand total register. With the machine of my above mentioned prior patent modified in accordance with disclosure of my prior Patent No. 2,240,797, subtraction on the front or item register may be effected by the method of complemental addition, that is, by entering the complements of the subtrahend on the keyboard, and either the actual amounts accumulated in the front or item register or the complements of such amounts may be transferred to and added in the rear or grand total register, whereby either addition or subtraction may be performed on the rear register.

Such duplex calculating machines have sometimes been provided with means, commonly known as "Decimal Transfer Cut-Out" means, manually settable to suppress or prevent transfers from the three lowest orders of the item totalizer to the corresponding three orders of the grand totalizer when that is desired. Such a "Decimal Transfer Cut-Out" means is disclosed in my last above mentioned prior Patent No. 2,240,797.

Known machines of that character have provisions for clearing the registers, such means usually being operable to clear the item register alone or to clear both the item and grand total register simultaneously. Usually, the means for clearing the item register is operated automatically as an incident to the operation of the means to effect transfers from the item register to the grand total register. The machine of my prior Patent No. 2,240,798 modified in accordance with my prior Patent No. 2,240,797 is so constructed.

In certain common uses of "Decimal Transfer Cut-Out" means in such machines, it is customary for the machine user, immediately before each transfer of an amount from the item register to the grand total register, to enter an extra "5" in the third lowest order, i. e., in the highest order in which transfer from the item register to the grand total register is to be suppressed, so that the actually transferred amount will be "rounded-off" to the nearest digit in the fourth lowest order, i. e., in the lowest order in which transferring from the item register to the grand total register is not suppressed. For example, let us assume that if an amount of 62.06500 has been accumulated in the item register when a transfer to the grand total register is to be effected, it is desired to transfer the "rounded-off" amount of 62.07 to the grand total register, but if 87.05333 has been accumulated in the item register when a transfer to the grand total register is to be effected, it is desired to transfer only the "rounded-off" amount 87.05 to the grand total register. When an additional .00500 is added to the item register before each transfer, the amounts in the item register are increased to 62.07000 and 87.05833 respectively, of which only 62.07 and 87.05 are actually transferred to the grand total register because of the suppression of transfers in the three lowest orders by the "Decimal Transfer Cut-Out" means.

While the above mentioned method of "rounding-off" is satisfactory for many purposes, it is not completely satisfactory for all purposes. It is readily apparent that the accumulation in the grand total register will usually differ from the true total of all amounts entered in the item register, frequently by one or several units in the fourth lowest order of the machine, i. e., in the lowest order in which transfers are not suppressed, and sometimes by one or more units in higher orders. For example,

| | |
|---|---|
| 62.06500 | 62.07000 |
| 87.05333 | 87.05000 |
| 41.77500 | 41.78000 |
| 33.66667 | 33.67000 |
| 73.87500 | 73.88000 |
| 59.12500 | 59.13000 |
| 357.56000 | 357.58000 |

The "error" can amount to as much as a full unit in the fourth lowest order for each two "rounded-off" transfers performed in accumulating the grand total in the grand total register, though the error will usually be less than that maximum amount.

In some classes of work in which such "rounding-off" errors are intolerable, it may be necessary to recheck the items or subtotals transferred from the item register to the grand total register and to adjust a sufficient number of such "rounded-off" amounts by adding or subtracting a unit to or from the lowest order of the "rounded-off" amount to eliminate the error and make the total of the "rounded-off" amounts equal to the total of the actual items accumulated in the item register. Such an adjusting procedure is time consuming and undesirable.

An object of the present invention is to provide a duplex calculating machine having "Decimal Transfer Cut-Out" means also with means for preventing the occurrence of "rounding-off" errors which could require such rechecking and adjustment of "rounded-off" amounts as above described.

A further object of the invention is to provide a duplex calculating machine having "Decimal Transfer Cut-Out" means also with means for automatically performing a modified form of "rounding-off" which will not require the machine operator, before each transfer operation, to enter the "rounding-off 5" on the keyboard in the highest order in which transfers are suppressed.

A further object of the present invention is to provide a duplex calculating machine having "Decimal Transfer Cut-Out" means also with settable means which will permit operation of the machine in accordance with the above described conventional "rounding-off" procedure, or operation of the machine to perform the automatic error preventing "rounding-off" method hereinafter described in detail, as the operator may desire.

Further objects of the invention are to increase the versatility of duplex calculating machines, to increase their efficiency, and to make possible the reduction of manual and mental labor required in their use.

My present invention is disclosed herein as applied to a duplex calculating machine constructed in accordance with my prior Patent No. 2,240,798 and incorporating also the subtraction and "Decimal Transfer Cut-Out" provisions disclosed in my prior Patent No. 2,240,797. In the accompanying drawings.

In the following description and accompanying drawings reference letters and numbers under 200 are employed to identify elements which are either identical with or essentially like elements designated by the same reference letters and numbers in my prior Patent No. 2,240,797. The drawings show only so much of the machine as appears necessary to a full understanding of my present invention, but it will be understood that except for the additions and alterations forming part of my present invention, the machine as a whole will be constructed in accordance with my prior Patents Nos. 2,240,798 and 2,240,797 to which reference may be made for full detailed disclosure of the the entire machine.

Figure 1:
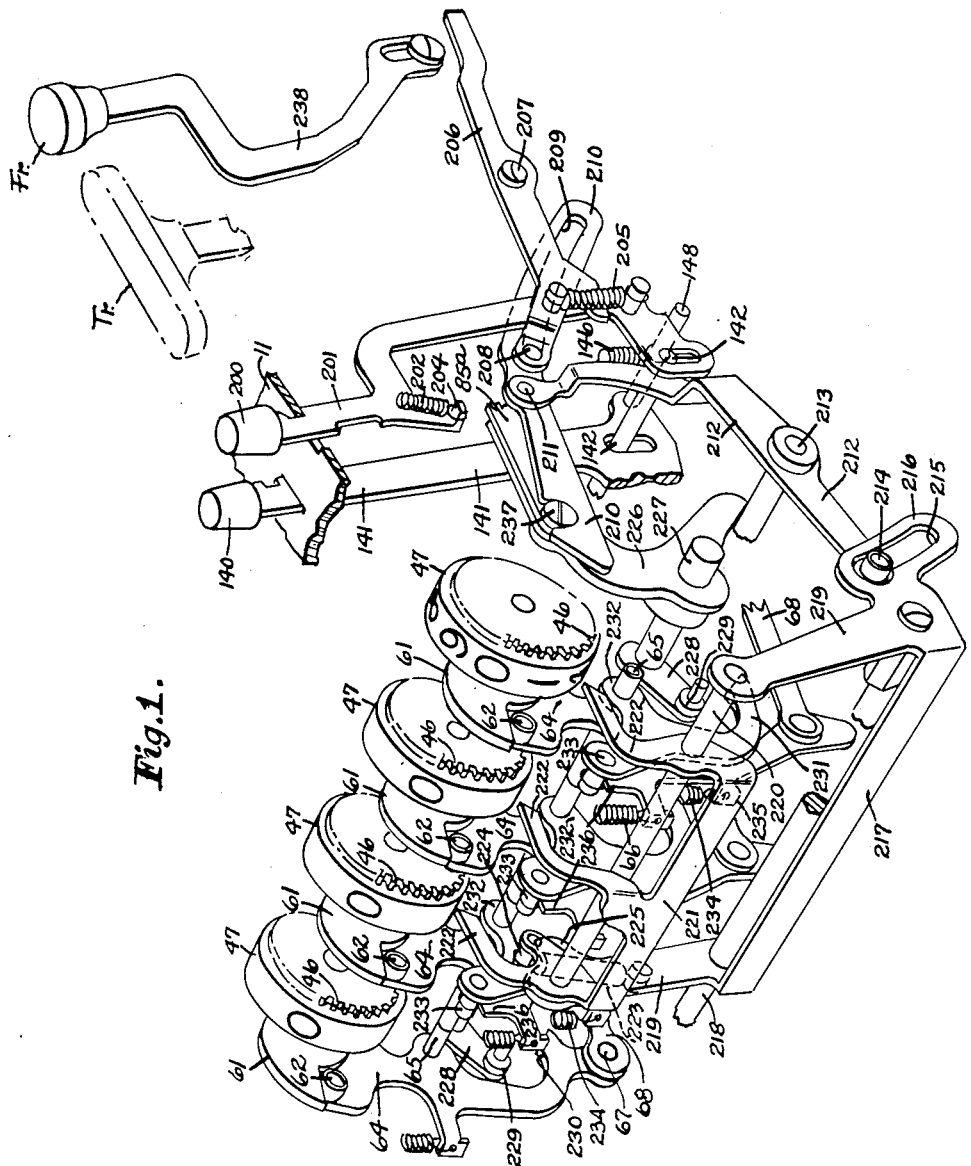
Fig. 1 is a perspective, as viewed from the upper front right-hand corner of the machine, showing certain parts of the four lowest orders of the front or item register and showing also a preferred form of my present invention.

The machine, as disclosed in my above-mentioned prior patents, is of the power operated, key-responsive type in which, upon depression of keys on the keyboard, electric motor driven mechanism immediately reciprocates stop bars 17 and actuator sectors 40 which, through pawl and ratchet drives 41, 42, 43, 44, advance the pinions 46 and connected numeral wheels 47 of the corresponding orders of the front register, parts of the four lowest orders of which are shown in Fig. 1, to extents corresponding to the digital values of the depressed keys. The front register as well as the rear register (not shown herein) are both of the kind disclosed in the Horton Patent 1,326,504 and comprise tens-transfer means of the "crawl carry" type including, for each numeral wheel 47 and pinion 46, a "snail" cam 61 rotating therewith and engaged by a cam follower roller 62 carried by a lever 64 pivoted on a shaft 65 and having a gear sector controlling planetary gearing which is connected between adjacent order numeral wheels 47 and by which tens-transfers are transmitted from the connected lower order numeral wheel 47 and pinion 46 to the connected higher order numeral pinion 46 and numeral wheel 47. Each cam follower lever 64, through a link 68, rocks a respective one of a series of stop sectors 74 on a supporting rod 73 to a position corresponding to the value accumulated on the numeral wheel 47 of the corresponding order of the front register.

A subtraction key 120 on a lever 119 also controls the positions of all of the stop sectors 74 so that, while the key 120 is held in its normal forward position by a tension spring 136, differential stop shoulders 75 corresponding to the values accumulated on the numeral wheels 47 of the corresponding order of the front register are positioned in the paths of lugs 77 on a series of transfer links 78 but when the key 120 is moved to its rearward position, it rocks the sectors 74 so that stop shoulders 76 corresponding to the complements of the values accumulated on the front register numeral wheels are placed in the paths of the lugs 77.

Upon depression of a transfer key Tr., power operated mechanisms causes the links 78 to be moved rearward to extents determined by engagement of their lugs 77 with stop shoulders 75 and to correspondingly advance the numeral wheels of the corresponding orders of the rear or grand total register whereby the amount standing in the front register is added to the rear register. When the subtraction key 120 is moved to its rearward position, it not only rocks the sectors 74 as stated above, but also rocks a bell crank 87 which depresses the transfer key Tr., whereby the links 78 are actuated to extents determined by the stop shoulders 76 and the amount accumulated in the front register is subtracted from the rear register by complemental addition.

Either upon depression of a front register clearing key Fr. or automatically upon return of the transfer links 78 to their normal forward positions following a transfer operation caused by a depression of the transfer key Tr., power operated mechanism disclosed in my above mentioned patents causes forward movement of a link 85a pivotally connected at its forward end to a stud 237 in the upper end of a crank arm 226 secured on the right hand end of a shaft 227, in manner disclosed in detail in said Horton patent. 2,240,797 but corresponding to the shaft S of the Horton Patent 1,326,504, is thereby rocked counterclockwise to clear the front register in the manner disclosed in detail in said Horton patent. In such clearing or cancelling operation, rollers 229 carried by arms 228 secured on the shaft 227 force the levers 64 clockwise to their "0" positions and the latter, acting through their gear sectors on the planetary "crawl" tens-transfer connections between numeral wheels 47 of adjacent orders, rotate the numeral wheels 47 reversely to their "0" positions.

By depression of a "Decimal Transfer Cut-Out" key 140, a stud 153 is moved to rock three cranks 154 on their supporting rod 78a to place the forward ends of the forward arms of these cranks immediately behind studs 157 secured in the three lowest order links 78 whereby transfers from the three lowest orders of the rear register are prevented. Means contolled jointly by the key 140 and the key 120 as disclosed in my Patent 2,240,797, insures that while both of these keys are in depressed position, amounts transferred to the rear register will be the full correct complements of amounts in the fourth lowest and all higher orders of the front register.

In the machine embodying my present invention a further control key 200 is placed immediately at the right of the previously mentioned "Decimal Transfer Cut-Out" key 140. The key 200 has a stem 201 which is mounted for sliding movement in a slot in the keyboard plate 11 and on the fixed stud 142 in the same manner as the stem 141 of the key 140. Like the key stem 141, the key stem 201 is formed near its upper end with a notch in its rear edge permitting the stem to be rocked a little rearward after it has been fully depressed so as to engage the lower edge of the notch under the edge of the plate 11 and thereby releasably latch the depressed key 200 and its stem 201 in depressed position until the key 200 is again manually moved forwardly to release it. Similarly to the key 140 and stem 141, the key 200 and key stem 201 are urged rearwardly and upwardly to normal position by a tension spring 202 connected at its upper rearward end to the stud 88 and at its lower end to a laterally bent lug 204 of the key stem 201. A lower end portion of the key stem 201 overlies the rightward end of the stud 148 secured in the key stem 141, the parts being so proportioned that when the key 200 is fully depressed and held or latched in depressed position, the key 140 and stem 141 are also depressed and held depressed insufficiently to permit the lower edge of the notch in the stem 141 to engage under the keyboard plate 11 but still sufficiently to rock the cranks 154 into blocking relation to the studs 157 and prevent transfers from the three lowest orders of the front register to the corresponding orders of the rear register.

The key stem 201 is also connected through a tension spring 205 with the forward arm of a lever 206 which is pivotally mounted intermediate its ends on the stud 207 (unnumbered in my Patent No. 2,240,797) on which the lower end of the stem 86 of the transfer key Tr. is guided. The forward arm of the lever 207 carries a stud 208 projecting leftwardly into an arcuate slot in the rearward arm of a pawl 210 which is pivotally mounted on a stud 211 in the upper end of a rearward and upward arm of a lever 212 which is pivoted intermediate its ends on a stud 213 secured in a frame plate of the machine. The forward arm of the lever 212 carries a roller stud 214 projecting rightwardly through an arcuate slot 215 in a rearward right side arm 216 of a yoke member 217 which is pivotally mounted on a rod 218 which is supported at its ends in vertical frame plates of the machine. At both its right and left ends the yoke member 217 has upwardly and forwardly inclined side arms 219, the upper ends of which carry a bail rod 220. A yoke member 221 pivotally supported on the rod 220 has three upwardly extending fingers 222 with rearwardly directed pointed ends. A tension spring 223 (Fig. 1) connected at its upper end to a stud 224 in a rearward left side arm of the yoke 221 and at its lower end to a stud in the left side arm 219 of the yoke 217, normally yieldingly holds the stud 224 against the upper edge of a rearward projection 225 of the left side arm 219 and positions the pointed ends of the fingers 222 a short distance forwardly away from the three lowest order pinions 46 while the yoke 217 is in its normal position.

The lower arm of the usual lever 64 for the fourth lowest order and each higher order of the front register of the present machine has a cam projection 230 (not numbered in my prior Patent No. 2,240,797) which is adapted to be engaged by the roller 229 for the corresponding order in each operation of the front register clearing mechanism to return that lever 64 and the numeral wheel 47 for the corresponding order of the front register to "0" position. In accordance with my present invention the cam projections 230 are removed from the levers 64 of the three lowest orders, and, in place thereof, similar cam projections 231 are formed on the lower arms of additional levers 232, one of which is pivotally mounted on the same shaft 65 which supports the levers 64 and next rightwardly to each of the three lowest order levers 64. An upwardly and forwardly extending arm of each lever 232 carries a stud 233 to which is secured the upper end of a tension spring 234 connected at its lower end to a laterally bent end of a lug 235 extending forwardly from the lower arm of the lever 64 at its left. The springs 234 normally maintain the respective studs 233 engaged against the upper edge of forward projections 236 of the respective levers 64 whereby the cam projection 231 of each lever 232 is normally held in such relation to its respective lever 64 as to return the latter and the corresponding numeral wheel 47 to "0" position when the lever 232 is returned to "0" position by the corresponding roller 229.

Figure 2:
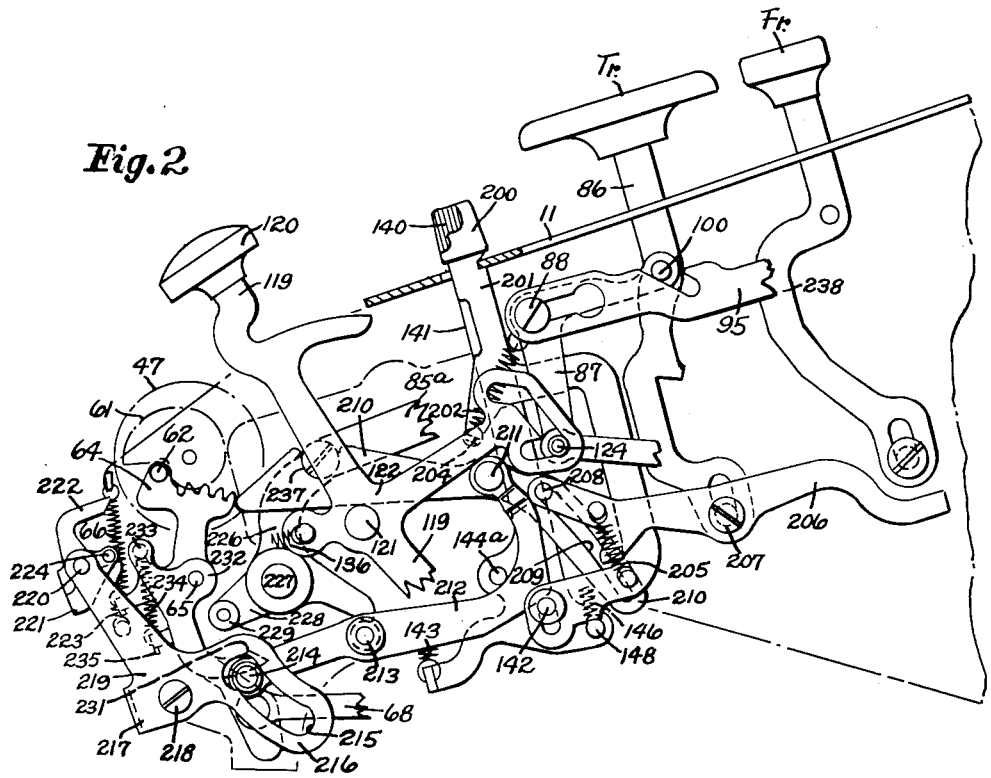
Fig. 2 shows the mechanism of Fig. 1 in right side elevation with the parts in normal position.
Figure 3:
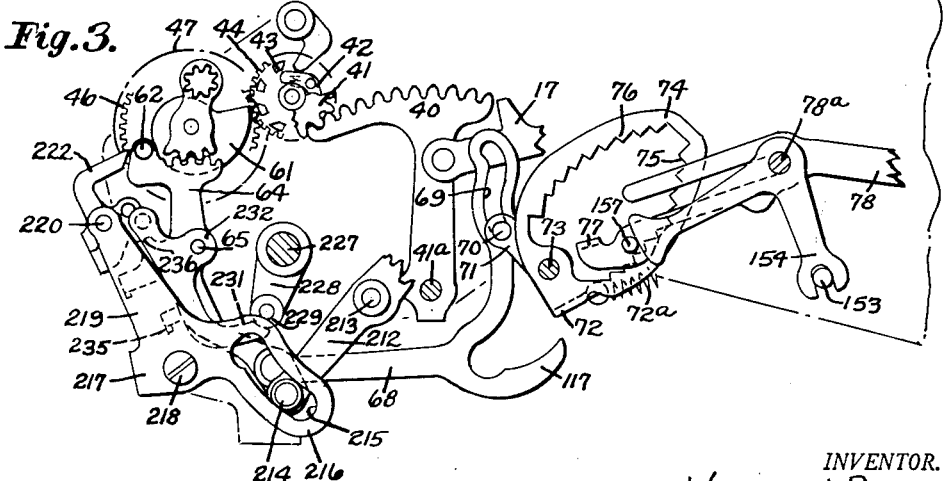
Fig. 3 shows the mechanism, also in right side elevation, with certain of the parts in positions to which they are moved during a transfer operation in which the mechanism of my invention is active.

When the key 200 is depressed, its stem 201, through the spring 205, rocks the lever 206 counterclockwise so that the stud 208 rocks the pawl 210 clockwise whereby a notch in the forward arm of the pawl 210 is caused to embrace the head of the stud 237. Then, when the cancelling mechanism is operated while the key 200 remains depressed, the pawl 210 is pulled forwardly and rocks the lever 212 counterclockwise. During the initial portion of the counterclockwise movement of the elever 212, the roller stud 214 moves downward in the slot 215, thereby rocking the yoke member 217 clockwise and engaging the pointed ends of the three fingers 222 between teeth of the respective gears 46 secured to the three lowest order numeral wheels 47. The slot 215 is arcuate about a center which coincides with the axis of the rod 213 when the yoke 217 is in its clockwise position but the upper end of the slot 215 is widened forwardly sufficiently to permit the yoke to be rocked counterclockwise by gravity to a normal position in which the ends of the fingers 222 are disengaged from the gears 46 while the lever 212 is in its normal clockwise position of Figs. 1 and 2. Thus, the yoke 217 is rocked to the clockwise transfer-suppressing position by the initial portion of the downward movement of the roller stud 214 out of the widened upper end of the slot 215 and is held stationary in such moved position during the entire time that the stud 214 is below the widened upper end portion of the slot 215. The movement of the stud 214 downward out of the widened upper end portion of the slot 215 is sufficient so that not only are the pointed ends of the fingers 222 engaged between teeth of the pinions 46, but the yoke 221 is also rocked on the rod 220 against the tension of the spring 223 so that the fingers 222 advance each of the three lowest order pinions 46 with its meshed pinion 44 slightly to provide sufficient clearance between the pawls 42 and ratchet teeth 43 to permit easy disengagement and re-engagement of the pawls 42 and the teeth 43 incidental to the clearing operation of the shaft 227 as explained in the Horton Patent 1,326,504.

The engagement of the fingers 222 with the three lowest order pinions 46 and the slight advance movement of the latter by the fingers 222 occurs before the clearing shaft 227 has rocked far enough counterclockwise to engage any of the rollers 229 with any of the cam projections 230 or 231. As the counterclockwise cancelling movement of the shaft 227 is completed the rollers 229 engage and act upon the cam projections 230 and 231 whereby the levers 64 and the numeral wheels 47 in the fourth lowest and all higher orders of the front register are restored to "0" positions. The levers 232 for the three lowest orders of the front register are also rocked to "0" positions but, as the fingers 222 hold the three lowest order numeral wheels 47 against backward rotation, the springs 234 yield without rocking the three lowest order levers 64. The fingers 222 continue to hold the three lowest order pinions 46 and numeral wheels 47 against rotation until, in the rearward return movement of the link 85a and clockwise return movement of the shaft 227, the three lowest order rollers 229 have moved clear of the cam projections 231 and the pawls 42 have re-engaged with the teeth 43.

Thus while the key 200 is in its depressed position the three lowest orders of the front register are not cleared in any transferring operation. The rearward arm of the lever 206, however, extends under the lower end of the stem 238 of the front register cancelling key Fr. so that when the latter key is depressed to clear the front register while the key 200 is in depressed position, the lever 206 is returned clockwise to its normal position and the pawl 210 is returned counterclockwise to its normal uncoupled position, the spring 205 yielding. Thus, during a front register cancelling operation brought about by depression of the front register cancelling key Fr. the fingers 222 remain in their normal forward positions clear of the three lowest order gears 46, and the springs 234 cause the three lowest order levers 64 to be rocked with the levers 232 by the three lowest order rollers 229 and return the three lowest order numeral wheels 47 and gears 46 to "0" position in the same manner that the higher order numeral wheels 47 and gears 46 are returned to "0" position.

It will be apparent that the above described machine embodying my present invention will operate in the same manner as the machine of my prior Patent No. 2,240,797, both when the key 140 is undepressed and when the key 140 is depressed without depression of the key 200. In other words, the machine may be operated to effect complete transfer to the rear register of the full exact amounts standing in the front register at the time each transfer operation is initiated if the key 140 is in its normal undepressed position. If the key 140 is in depressed position but the key 200 is in normal undepressed position at the time of a transfer operation, transfers from the three lowest orders of the front register with the corresponding order of the rear register will be prevented by the cranks 164 and all orders of the front register will be cleared as an incident to the transferring operation, the three lowest order levers 64 being rocked with the levers 232. Thus, with the key 140 depressed and the key 200 in normal position the conventional previously described "rounding-off" procedure may be followed.

While the key 200 is depressed and the key 140 is thereby also held depressed not only are transfers from the three lowest orders of the front register to the corresponding orders of the rear register prevented, but also clearing of the three lowest orders of the front register as an incident to the transferring operation is also prevented. Accordingly, decimal amounts which are not transferred from the three lowest orders of the front register to the corresponding orders of the rear register continuously accumulate in the front register while the key 200 remains depressed, and each time the so continuously accumulated decimal amount exceeds the capacity of the three lowest orders of the front register, a unit is transferred to the fourth lowest order of the front register and, in the next following transfer operation, is transferred to the fourth order of the rear register. Consequently, while the key 200 remains depressed, the grand total accumulated in the rear register will be exactly equal to the total of all items entered into the front register minus the decimal amount standing in the three lowest orders of the front register at the time of the last transferring operation. At the time of the last transferring operation the operator may note the amount standing in the three lowest orders of the front register and if it is equal to or greater than some predetermined amount, such as "500", the operator may, if desired, increase the amount in the rear register by a unit in the fourth lowest order or, alternatively, prior to the last transferring operation, the operator may enter a "rounding-off .5" in the third lowest order of the front register by depression of the "5" key in the third lowest order bank of keys.

The following example will illustrate the result secured with the key 200 depressed and will show how any necessity for rechecking and adjusting "rounded-off" amounts transferred to the rear register is avoided by use of my present invention. Column A shows the sequence and the character of operation performed, entries of amounts into the front register through the keyboard being designated simply "Entry" and transfers from the front register to the rear register being indicated merely by "Transfer." Column B shows the amount either entered on the keys or transferred to the rear register as indicated in column A, column C shows the reading of the front register dial wheels at the completion of the operation, and column D shows the readings of the rear register numeral wheels.

|    | A        | B        | C        | D         |
|----|----------|----------|----------|-----------|
| 0  |          |          | 00.00000 | 000.00000 |
| 1  | Entry    | 40.05000 | 40.05000 | 000.00000 |
| 2  | do       | 22.01500 | 62.06500 | 000.00000 |
| 3  | Transfer | 62.06000 | 00.00500 | 062.06000 |
| 4  | Entry    | 55.02000 | 55.02500 | 062.06000 |
| 5  | do       | 32.03333 | 87.05833 | 062.06000 |
| 6  | Transfer | 87.05000 | 00.00833 | 149.11000 |
| 7  | Entry    | 30.00000 | 30.00833 | 149.11000 |
| 8  | do       | 11.77500 | 41.78333 | 149.11000 |
| 9  | Transfer | 41.78000 | 00.00333 | 190.89000 |
| 10 | Entry    | 23.50000 | 23.50333 | 190.89000 |
| 11 | do       | 10.16667 | 33.67000 | 190.89000 |
| 12 | Transfer | 33.67000 | 00.00000 | 224.56000 |
| 13 | Entry    | 40.37500 | 40.37500 | 224.56000 |
| 14 | do       | 33.50000 | 73.87500 | 224.56000 |
| 15 | Transfer | 73.87000 | 00.00500 | 298.43000 |
| 16 | Entry    | 24.25500 | 24.26000 | 298.43000 |
| 17 | do       | 34.87333 | 59.13333 | 298.43000 |
| 18 | Transfer | 59.13000 | 00.00333 | 357.56000 |

The exact total of all amounts entered on the keys in the above example is 357.56333 which is exactly equal to the sum of the reading on the rear register numeral wheels plus the reading on the three lowest order numeral wheels of the front register when the work is completed. At that time the operator, as desired, may or may not adjust any one amount entered on the keys to take into account the amount remaining on the three lowest order numeral wheels of the front register. It will generally be satisfactory to adjust the last amount entered on the keys. In any case, there will be no need to adjust more than one item and, consequently, no need to make a time consuming re-check of a long list of items. The difference between the reading on the numeral wheels of the rear register and the total of all items entered into the front register can never exceed 0.00999, which can be compensated by adjustment of a single item.

I claim:

1. In a calculating machine having manipulative amount entering means, a first register comprising registering wheels for a plurality of numerical orders to accumulate amounts entered through said manipulative means, and carry means between registering wheels of successive orders, a second register, a drive means operable through an operating cycle, amount transferring means operable by said drive means to transfer to said second register, in a portion of said cycle, amounts previously accumulated on the registering wheels of said first register in orders higher than a predetermined order, and "0" setting means for each of the registering wheels of said first register and operable by said drive means to set that registering wheel to "0" in a later portion of said cycle, the combination of a yielding connection in each of the "0" setting means for the registering wheels for said predetermined order and any lower orders of said first register, means to hold the registering wheels of said predetermined order and any lower orders of said first register against rotation during operation of said "0" setting means, means operable by said drive means to render said holding means effective during said later portion of said cycle, and manipulative means to control said rendering means.

2. In a calculating machine having amount entering means, a first register comprising registering wheels for a plurality of numerical orders to accumulate amounts entered through said amount entering means, and carry means between registering wheels of successive orders, a second register including registering wheels for a like plurality of numeral orders, a drive means operable through an operating cycle, amount transferring means including elements for each of said orders operable by said drive means to transfer to the registering wheel of a respective order of said second register, in a portion of said cycle, an amount previously accumulated on the registering wheel of the corresponding order of said first register, means to prevent the amount transferring elements for a predetermined order and any lower orders from transferring any amounts accumulated on the registering wheels of such orders of the first register to the registering wheels of corresponding orders of said second register, manipulative means to render said preventing means effective, and "0" setting means for each of the registering wheels of said first register and operable by said drive means to set that registering wheel to "0" in a later portion of said cycle, the combination of a yielding connection in each of the "0" setting means for the registering wheels for said predetermined order and all lower orders of said first register, means to hold the registering wheels of said predetermined and lower orders of said first register against rotation during operation of said "0" setting means, means operable by said drive means to render said holding means effective during said later portion of said cycle and a second manipulative means to place said preventing means and said rendering means in effective condition.

3. In a calculating machine having amount entering means, a first register comprising registering wheels for a plurality of numerical orders to accumulate amounts entered through said amount entering means, and carry means between registering wheels of successive orders, a second register including registering wheels for a like plurality of numeral orders, a drive means operable through an operating cycle, amount transferring means including elements for each of said orders operable by said drive means to transfer to the registering wheel of a respective order of said second register, in a portion of said cycle, an amount previously accumulated on the registering wheel of the corresponding order of said first register, means to prevent the amount transferring elements for a predetermined order and any lower orders from transferring any amounts accumulated on the registering wheels of such orders of the first register to the registering wheels of corresponding orders of said second register, manipulative means to render said preventing means effective, "0" setting means for each of the registering wheels of said first register to set that registering wheel to "0," and means movable by said drive means in an operating movement to operate said "0" setting means to move the registering wheels of said first register to "0" during an intermediate portion of said operating movement after operation of said transferring means, the combination of a yielding connection in each of the "0" setting means for the registering wheels for said predetermined order and all lower orders of said first register, normally ineffective means to hold the registering wheels of said predetermined and lower orders of said first register against rotation, means connectible to said movable means for moving said holding means to holding position in an initial portion of said operating movement prior to movement of said registering wheels of said first register by said "0" setting means and to maintain said holding means in holding position throughout said intermediate portion of said operating movement, and a second manipulative means to render said preventing means effective and to correct said connectible means to said movable means for moving said holding means to holding position.

4. In a calculating machine having amount entering means, a first register comprising registering wheels for a plurality of numerical orders to accumulate amounts entered through said amount entering means, and carry means between registering wheels of successive orders, a second register, a drive means operable through an operating cycle, amount transferring means operable by said drive means to transfer to said second register, in a portion of said cycle, amounts previously accumulated on the registering wheels of said first register in orders higher than a predetermined order, "0" setting means for each of the registering wheels of said first register to set that registering wheel to "0", and means movable by said drive means in an operating movement to operate said "0" setting means to move the registering wheels of said first register to "0" during an intermediate portion of said operating movement after operation of said transferring means, the combination of a yielding connection in each of the "0" setting means for the registering wheels for said predetermined order and all lower orders of said first register, normally ineffective means to hold the registering wheels of said predetermined and lower orders of said first register against rotation, means connectible to said movable means for moving said holding means to holding position in an initial portion of said operating movement prior to movement of said registering wheels of said first register by said "0" setting means and to maintain said holding means in holding position throughout said intermediate portion of said operating movement, and a manipulative means to connect said connectible means to said movable means.

5. In a calculating machine having amount entering means, a first register comprising registering wheels for a plurality of numerical orders to accumulate amounts entered through said amount entering means, and carry means between registering wheels of successive orders, a second register, a drive means operable through an operating cycle, amount transferring means operable by said drive means to transfer to said second register, in a portion of said cycle, amounts previously accumulated on the registering wheels of said first register in orders higher than a predetermined order, "0" setting means for each of the registering wheels of said first register and operable by said drive means to set that registering wheel to "0" in a later portion of said cycle, means movable by said drive means in an operating movement to operate said "0" setting means to move the registering wheels of said first register to "0" during an intermediate portion of said operating movement after operation of said transferring means, a manipulative means to condition said amount transferring means for operation by said drive means and to initiate a cycle of operation of the latter, a second manipulative means to initiate a cycle of operation of said drive means to cause said movable means to operate said "0" setting means, the combination of a yielding connection in each of the "0" setting means for the registering wheels for said predetermined order and all lower orders of said first register, normally ineffective means to hold the registering wheels of said predetermined and lower orders of said first register against rotation, means connectible to said movable means for moving said holding means to holding position, a means manually settable to connect said connectible means to said movable means for operation by the latter in subsequent operating movements of the latter to move said holding means to holding position in an initial portion of said operating movement prior to movement of said registering wheels of said first register by said "0" setting means and to maintain said holding means in holding position throughout said intermediate portion of said operating movement, and means operable by said second manipulative means to disable said connectible means and thus prevent movement of said holding means to holding position by the operating movement of said movable means.

6. In a calculating machine having amount entering means, a first register comprising registering wheels for a plurality of numerical orders to accumulate amounts entered through said amount entering means, and carry means between registering wheels of successive orders, a second register, a drive means, amount transferring means operable by said drive means to transfer to said second register amounts previously accumulated on the registering wheels of said first register in orders higher than a predetermined order, "0" setting means for each of the registering wheels of said first register and operable by said drive means to set that registering wheel to "0" after operation of said transferring means, a first manipulative means to condition said transferring means for operation by said drive means and to initiate an operation of the latter, and a second manipulative means to cause operation of said drive means to operate said "0" setting means without operation of said transferring means, the combination of a yielding connection in each of the "0" setting means for the registering wheels for said predetermined order and any lower orders of said first register, normally ineffective means to hold the registering wheels of said predetermined order and any lower orders of said first register against rotation, means operable by said drive means to move said holding means to holding position prior to operation of said "0" setting means and to be returned to normal after operation of the latter, manually settable control means to render said moving means operable by said drive means in operations of the latter, and means controlled by said second manipulative means to prevent operation of said moving means by said drive means in operations of the latter caused by said second manipulative means.

WALTER J. PASINSKI.

References Cited in the file of this patent

UNITED STATES PATENTS

| Number | Name | Date |
|---|---|---|
| 813,281 | Crandall | Feb. 20, 1906 |
| 1,016,276 | Kilpatrick | Feb. 6, 1912 |
| 1,415,174 | Horton | May 9, 1922 |
| 1,608,145 | Tingley | Nov. 23, 1926 |
| 2,095,368 | Muller | Oct. 12, 1937 |
| 2,240,797 | Pasinski | May 6, 1941 |
| 2,240,798 | Pasinski | May 6, 1941 |
| 2,422,103 | Lambert | June 10, 1947 |